(12) United States Patent
McGee et al.

(10) Patent No.: US 6,423,778 B1
(45) Date of Patent: *Jul. 23, 2002

(54) PROCESS FOR COATING OLEFINIC SUBSTRATES

(75) Inventors: John D. McGee, Avon, IN (US); Craig Schang, Madison Heights, MI (US)

(73) Assignee: BASF Corporation, Southfield, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/343,952

(22) Filed: Jun. 30, 1999

(51) Int. Cl.[7] .......................... C08L 67/02; C08L 53/00
(52) U.S. Cl. .......................... 525/165; 525/90; 525/92; 525/92 F; 524/495; 524/496; 524/505; 156/309.6
(58) Field of Search .................. 525/92 F, 92, 525/90, 88, 165; 524/495, 496, 505; 427/316, 322; 156/309.6

(56) References Cited

U.S. PATENT DOCUMENTS

| | | | |
|---|---|---|---|
| RE27,145 E | 6/1971 | Jones | |
| 3,666,701 A | 5/1972 | Marrs | |
| 4,039,593 A | 8/1977 | Kamienski et al. | |
| 4,380,567 A | * 4/1983 | Shigemoto | 428/213 |
| 4,692,496 A | * 9/1987 | Bahl et al. | 525/240 |
| 4,717,711 A | 1/1988 | Vanier et al. | |
| 4,769,418 A | * 9/1988 | Mizuno et al. | 525/106 |
| 4,874,818 A | 10/1989 | Yamamoto | |
| 4,898,965 A | 2/1990 | Kinoshita et al. | 558/416 |
| 5,106,446 A | 4/1992 | Beck et al. | |
| 5,376,745 A | 12/1994 | Handlin et al. | |
| 5,458,933 A | 10/1995 | Suskind | |
| 5,486,387 A | * 1/1996 | Mueller | 428/34.7 |
| 5,486,570 A | 1/1996 | St. Clair | |
| 5,488,455 A | 1/1996 | Cahill et al. | |
| 5,500,163 A | 3/1996 | Ponnet | |
| 5,512,333 A | 4/1996 | Suskind | |
| 5,536,544 A | 7/1996 | Liegeois | |
| 5,552,504 A | * 9/1996 | Bennett et al. | 526/348.1 |
| 5,597,864 A | 1/1997 | Leiss | |
| 5,667,856 A | 9/1997 | Kamen et al. | |
| 5,830,578 A | 11/1998 | Ono et al. | |
| 5,853,898 A | 12/1998 | Obara et al. | |
| 6,139,930 A | * 10/2000 | Comer et al. | 428/36.5 |
| 6,217,934 B1 | * 4/2001 | Eilenberger | 427/8 |

FOREIGN PATENT DOCUMENTS

| | | | |
|---|---|---|---|
| DE | 42 11 412 A1 | 4/1992 | |
| EP | WO 94/16027 | 7/1994 | |
| EP | 0651013 A | 5/1995 | ........... C08L/51/00 |
| EP | 0 698 638 A | 2/1996 | |
| EP | WO 9735937 | 10/1997 | ......... C09D/119/00 |
| EP | WO 98/15601 | 4/1998 | |
| EP | 20837097 A | 4/1998 | ........... C08L/23/00 |
| EP | 0982337 A | 3/2000 | ........... C08G/63/00 |
| JP | 03-060113 | 3/1991 | |
| JP | 03-065829 | 3/1991 | |
| JP | 04-025454 | 1/1992 | |
| JP | 4-38777 | 4/1992 | |
| JP | 07-223297 | 8/1995 | |
| JP | 08-081616 | 3/1996 | |
| JP | 8-207569 | 8/1996 | |
| JP | 2627839 | 4/1997 | |
| JP | WO 98/03334 | 1/1998 | |
| JP | 10-110024 | 4/1998 | |
| WO | WO 97/35937 | 10/1997 | |

OTHER PUBLICATIONS

English Abstract for JP10–110024.
English Abstract for JP03–060113.
English Abstract for JP03–065829.
English Abstract for JP04–025454.
English Abstract for JP07–223297.
English Abstract for JP08–081616.
English Abstract for JP06–065467.
English Abstract for DE42 11 412 A1.
English Abstract for JP4–38777.
English Abstract for JP2627839.
English Abstract for JP8–207569.
U.S. Application entitled "Compound and Coating Compositions for Adhesion toOlefinic Substrates," S/N 09/143,156 filed Aug. 28, 1998.
David J. St.Clair, "Coating Resins Based On Melamine Cured Polyolefin Diol," Technical Bulletin, Shell Chemical Company, TPO's in Automotive 1996 Conference (1996).
Karen M. McNeal, "Low Viscosity Functionalized Liquid Polymers—a New Approach for Adhesion to Non–Polar Substrates,"Technical Bulletin, Shell Chemical Company, TPO's in Automotive Conference (1996).

* cited by examiner

*Primary Examiner*—Sam Chuang Yao
(74) *Attorney, Agent, or Firm*—Anna M. Budde

(57) ABSTRACT

A free paint film is formed and applied to a substrate with heat, pressure, or both. The free paint film includes an outer layer formed from a composition that includes an olefinic material. The olefinic material is an olefin-based block copolymer with an olefin block that is at least substantially saturated and at least one (poly)ester or (poly)ether block, an at least substantially saturated polyolefin polyol having a number average molecular weight of from about 500 to about 20,000 or a derivative thereof, or a combination of both.

9 Claims, No Drawings

PROCESS FOR COATING OLEFINIC SUBSTRATES

FIELD OF THE INVENTION

This invention concerns a process for applying coatings to olefinic substrates, particularly thermoplastic polyolefin (TPO) substrates.

BACKGROUND OF THE INVENTION

It is often desirable, for decorative or functional reasons, to apply a coating over a plastic substrate. It has been difficult to obtain good adhesion of paints to olefinic substrates, including thermoplastic polyolefin (TPO) substrates and other such modified polyolefin-based materials. As used in the art, "thermoplastic polyolefin" or "TPO" designates a rubber-filled polyolefin. The rubber domains may be, for example, EPDM rubber, but other rubbers may be used.

In addition to painted articles, TPO has been used in a color-in-mold process to produce articles of the desired colored that are not intended to be painted, so long as the requirements for appearance are not stringent. The color-in-mold process, however, is not adequate for producing high class ("class 1") surfaces for a number of reasons. First, it is difficult to achieve high gloss finishes, and difficult to control the gloss of the finish reproducibly from one article to the next. Secondly, TPO is relatively soft and it would be desirable to coat the substrate with a coating composition that can offer resistance to marring and scratching. Finally, uncoated or unpainted TPO may have unsatisfactory weathering properties (i.e., may degrade, discolor, or chalk during outdoor exposure) in certain applications, whereas coatings can provide good weathering characteristics to many different substrates. For these reasons, then, it would be desirable to have a means of applying a coating composition to an olefinic substrate such as TPO to provide the properties lacking in the uncoated (raw) uncolored or colored substrate.

Plastic substrates may be coated with curable, or thermosettable, coating compositions. Thermosettable coating compositions are widely used in the coatings art, particularly for high-performance primers and topcoats. Color-plus-clear composite coatings have been particularly useful as topcoats for which exceptional gloss, depth of color, distinctness of image, or special metallic effects are desired.

In the past, it has been necessary to include one or more additional, separate, manufacturing steps to prepare an olefinic substrate for painting so that the coating layer will be able to adhere to the olefinic substrate. According to one frequently used method, a thin layer of an adhesion promoter or tie layer is applied directly to the olefinic substrate. The desired coating layer or layers are then applied over the adhesion promoter. Such adhesion promoters typically include a chlorinated polyolefin. Adhesion promoters with chlorinated polyolefins are, however, expensive to use, often exhibit instability, and, if used in a clear (unpigmented) composition, produce colored, hazy films. In addition, the chlorinated polyolefin materials may produce coatings with poor exterior durability because they are susceptible to degradation when exposed to UV light. Another method that has been used to prepare an olefinic substrate to receive a coating layer is chemical modification of the substrate surface, for example by flame or corona pretreatment.

Recently, coating compositions that include significant concentrations of adhesion promoting agents in order to achieve good adhesion to olefinic substrates have been proposed. Published international application WO 97/35937 describes a composition that includes 5–45% by weight of resin solids of a substantially saturated polyhdroxylated polydiene polymer having terminal hydroxyl groups. International Publication Number WO 97/35937 and all of the references cited therein are hereby incorporated herein by reference. The international publication '937 discloses that such polymers are the hydrogenated product of dihydroxy polybutadiene produced by anionic polymerization of conjugated diene hydrocarbon capped with two moles of ethylene oxide and terminated with two moles of methanol. (The ethylene oxide produces the oxygenated anion, and the methanol provides the hydrogen cation to form the hydroxyl group.)

The large amount of the hydrogenated polyhydroxylated polydiene polymer adhesion promoting agent that must be included may adversely affect physical properties and appearance of the resulting coating. In addition, compositions that include significant concentrations of the adhesion promoting agent may separate into phases because the different components frequently are not very compatible. The '937 reference requires a specific solvent package that may be undesirable in many instances. The same problems are encountered with other prior art adhesion promoting agents such as chlorinated polyolefins. It is also known that including chlorinated polyolefins in some coating compositions, e.g., curable coating compositions that include acid catalysts, can result in adverse interactions between the different components of the coating composition.

Yamamoto et al., U.S. Pat. No. 4,874,818 discloses a primer composition for plastic and steel substrates that includes a polycaprolactone graft of a styrene-butadiene-styrene block copolymer or a hydrogenated styrene-butadiene-styrene block copolymer. The primer composition is applied to the desired substrate as a solventborne primer coating composition having at least 50% by weight organic solvent, generating unwanted emissions.

Co-pending patent application Ser. No. 09/143,156 describes a coating composition for olefinic substrates that includes an olefin block that is substantially saturated and at least one (poly)ester or (poly)ether block. The olefin-based block copolymer can be prepared by reacting a low molecular weight hydroxyl-functional, saturated or substantially saturated olefin polymer with a chain-extension reagent that is reactive with hydroxyl groups and will polymerize in a head-to-tail arrangement of monomer units. The olefin-based block copolymer of the invention provides excellent adhesion either used as an adhesion promoter layer or as an additive in a curable coating composition, even when used in very minor amounts compared to the amounts required for previously known agents.

One problem in coating plastic parts such as TPO has been the expense and space required to install and maintain a paint shop. The expense of a paint shop includes not only the cost of equipment for applying and curing the coating, but also abatement equipment and other expenses relating to regulatory compliance with extensive government rules for coatings operations. Such expenses are difficult for a smaller manufacturer to bear.

For these reasons, it would be desirable to provide a free paint film that can readily be laminated onto the article to be painted to produce a laminated article without the emissions problem.

Harvey, U.S. Pat. No. 5,389,178 discloses applying with heat and pressure a film of a crosslinked rubbery polymer to a polyolefin sheet or film that is not rubber modified. The crosslinked rubbery polymer is produced by a multi-stage reaction in which the first stage is formed predominantly from butyl acrylate and the second stage is formed predominantly from methyl methacrylate. The laminate is mechanically separated so that a thin layer of the crosslinked rubbery material remains on the surface of the polyolefin sheet or film. The modified polyolefin sheet or film is then laminated with a (meth)acrylic sheet or with a latex, solvent-containing paint, or ink. The Harvey method provides improved adhesion but still requires application of the latex or paint in its usual form. Moreover, the film must be separated and removed to leave the tie layer as a by-product of the process. It is a further drawback of the process that the method leaves small surface holes that produces a matte surface, making the process unworkable when a glossy finish is desired.

Marrs, U.S. Pat. No. 3,666,701 discloses a laminating adhesive having an A-B structure, with A being a block of polymerized, conjugated dienes and B being a polylactone block. The laminating adhesive is applied to the substrate as a solution or dispersion in an organic solvent. The Marrs process thus produces regulated emissions even if a subsequent coating is applied as an already-formed film.

SUMMARY OF THE INVENTION

The present invention provides a method of coating an olefinic substrate with a free paint film. By the term "free paint film" it is meant a film unattached to any substrate, which film may be a single paint layer or a composite of paint layers. The free paint film is typically up to about 20 mils thick. The film may be of uniform thickness, for example to coat an entire article or surface thereof, or may be tapered to otherwise contoured, for example having tapered edges to blend into a pre-existing coating for spot repair.

The surface of the free paint film that is brought into contact with the olefinic surface is obtained from a composition including a low molecular weight, saturated or substantially saturated polyolefin polyol or an olefin-based block copolymer that has an olefin block and at least one (poly)ester or (poly)ether block. By the terms "(poly)ester block" and "(poly)ether block" it is meant that the base polyolefin material is modified with one or more one monomer units through formation of, respectively, ester or ether linkages. For purposes of the present invention, "(poly)ester block" has a special meaning that, in the case of two or more monomer units, the monomer units are predominantly, preferably exclusively, arranged in head-to-tail linkages. Thus, the arrangement of the ester linkages in the (poly)ester block or blocks may be represented by

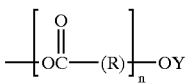

in which n represents the number of monomer units, R represents the part of each monomer unit between the ester groups (which may be all the same if only one type of monomer is used or different for individual units if a mixture of different monomers is used), and Y represents the end group of the block. The monomer units should be arranged exclusively in the head-to-tail arrangement, although it is possible, particularly in longer blocks, for there to be some variation; in the latter case, the arrangement should still be predominantly head-to-tail. Preferred embodiments for n, R, and Y are described below.

The olefin-based block copolymer can be prepared by reacting a low molecular weight hydroxyl-functional, saturated or substantially saturated olefin polymer with a chain-extension reagent that is reactive with hydroxyl groups and will polymerize in a head-to-tail arrangement of monomer units. Such chain-extension reagents include, without limitation, lactones, hydroxy carboxylic acids, oxirane-functional materials such as alkylene oxides, and combinations of these. Preferred chain-extension reagents are lactones and alkylene oxides, and even more preferred are epsilon caprolactone, ethylene oxide, and propylene oxide.

The low molecular weight polyolefin polyol or olefin-based block copolymer or combination of the two is included in at least the layer of the free paint film that that is brought into contact with the olefinic surface of the substrate. Among the possible innermost layers that may include the low molecular weight polyolefin polyol or olefin-based block copolymer are an adhesion promoter layer, a primer or primer-surfacer layer, or a topcoat layer. If the topcoat is a two-layer composite coating of basecoat and clearcoat layers, then the low molecular weight polyolefin polyol or olefin-based block copolymer is included in the basecoat layer.

The free paint films containing the olefin-based block copolymer have excellent adhesion to olefinic substrates like TPO, even when the olefin-based block copolymer is used in very minor amounts compared to the amounts required for previously known agents. In the case of the low molecular weight polyolefin polyol, a greater amount of the polyolefin polyol is generally included. The adhesion promoter or coating layer is applied directly to an unmodified plastic substrate, in other words, to a plastic substrate that has no flame or corona pretreatment or any other treatment meant to chemically modify the surface of the substrate and to which no previous adhesion promoter or coating has been applied.

When used as an additive, the substantially saturated polyolefin polyol or olefin-based block copolymer may be included in a variety of coating compositions to provide free paint films with good adhesion to TPO and other olefinic substrates. Compositions used to prepare the free paint films of the invention include primers, one-layer topcoats, basecoats, and clearcoats. In one preferred method according to the invention, a free clearcoat film containing the olefin-based block copolymer is applied over a colored TPO substrate.

The free paint films that include the low molecular weight polyolefin polyol or block copolymer additive can be formulated to provide gloss over a wide range of values suited to particular applications. In addition, the free paint films of the invention may be applied to impart desirable surface properties to the TPO or olefinic articles, such as resistance to scratching and marring, as well as enhance the weathering durability of such articles.

DETAILED DESCRIPTION

The low molecular weight, saturated or substantially saturated polyolefin polyol used in the free film of the invention preferably has a number average molecular weight of from about 1000 up to about 5000, more preferably from about 1000 up to about 3500, and even more preferably from about 1500 up to about 3500.

The olefin-based block copolymer used in the free films of the invention has at least one block that is a (poly)ester or (poly)ether block and at least one block that is an olefin material. Preferably, the block copolymer has one block of the olefin material to which is attached one or more of the (poly)ester and/or (poly)ether blocks. In one embodiment, the olefin-based block copolymer of the invention can be represented by a structure

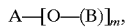

in which A represents an olefin block, B represents a (poly)ester or (poly)ether block or combinations thereof, and m is on average from about 0.7 to about 10, preferably from about 1.7 to about 2.2, and particularly preferably about 1.9 to about 2. The A block is a saturated or substantially saturated olefin polymer. The B block preferably contains, on average, from about 0.5 to about 25 monomer units, more preferably the B block has on average from about 2 to about 10, and even more preferably from about 2 to about 6, monomer units per hydroxyl group of the unmodified olefin block. The monomer units may be the same or there may be different monomer units in a single (poly)ester or (poly)ether block. For example, a (poly)ether block may have one or more ethylene oxide units and one or more propylene oxide units.

The olefin-based block copolymer can be prepared by reacting a low molecular weight polyolefin polyol with a chain-extension reagent that is reactive with hydroxyl groups and will polymerize in a head-to-tail arrangement of monomer units. The polyolefin polyol forms the A block, which the chain-extension reagent forms the B block or blocks. Such chain-extension reagents include, without limitation, lactones, hydroxy carboxylic acids, oxirane-functional materials such as alkylene oxides, and combinations of these. Preferred chain-extension reagents are lactones and alkylene oxides, and even more preferred are epsilon caprolactone, ethylene oxide, propylene oxide, and combinations of these.

The hydroxyl-functional polyolefin may be produced by hydrogenation of a polyhydroxylated polydiene polymer. Polyhydroxylated polydiene polymers may be produced by anionic polymerization of monomers such as isoprene or butadiene and capping the polymerization product with alkylene oxide and methanol, as described in U.S. Pat. Nos. 5,486,570, 5,376,745, 4,039,593, and Reissue 27,145, each of which is incorporated herein by reference. The polyhydroxylated polydiene polymer is saturated or substantially saturated by hydrogenation of the double bonds that is at least 90 percent, preferably at least 95% and even more preferably essentially 100% complete to form the hydroxyl-functional olefin polymer. The hydroxyl equivalent weight of the hydroxyl-functional saturated olefin polymer may be from about 500 to about 20,000. The hydroxyl-functional olefin polymer is preferably a hydroxyl-functional ethylene/butylene polymer. Preferred olefin polymers may have a number average molecular weight of from about 1000 to about 10,000. More preferably, the number average molecular weight is from about 1000 up to about 5000, even more preferably from about 1000 up to about 3500, and still more preferably from about 1500 up to about 3500.

The olefin polymer is preferably a low molecular weight poly(ethylene/butylene) polymer having at least one hydroxyl group. In another preferred embodiment the polyolefin polyol is a hydrogenated polybutadiene. In forming the hydrogenated polybutadiene polyol, part of the butadiene monomer may react head-to-tail and part may react by a 1,3 polymerization to yield a carbon-carbon backbone having pendent ethyl groups from the 1,3 polymerization. The relative amounts of head-to-tail and 1,3 polymerizations can vary widely, with from about 5% to about 95% of the monomer reacting head to tail. Preferably, from about 75 to about 95% of the monomer reacts head-to-tail. Among preferred hydrogenated polyolefin polyols are those available under the trademark POLYTAIL™ from Mitsubishi Chemical Corporation of Japan, including POLYTAIL™ and POLYTAIL™ HA.

In a preferred embodiment, the olefin polymer has from about 0.7 to about 10 hydroxyl groups on average per molecule, more preferably from about 1.7 to about 2.2 hydroxyl groups on average per molecule, and still more preferably about 2 hydroxyl groups on average per molecule. The hydroxyl-functional olefin polymer preferably has terminal hydroxyl groups and a hydroxyl equivalent weight of from about 1000 to about 3000.

Anionic polymerization results in polymers having a very narrow molecular weight distribution. Molecular weight distributions of less than about 1.2, particularly about 1.1 or less, are preferred for the hydroxyl functional polyolefin.

While not wishing to be bound by theory, it is believed that the mechanism that results in adhesion of the coating film to the substrate involves a migration of the olefin-based block copolymer to the inner surface of the film during its preparation, where it is available for interaction with the olefinic or TPO substrate during the lamination process. The interaction with the olefinic or TPO substrate at the film-substrate interface is believed to be facilitated by application of heat and/or pressure during laminating. It is also believed that the migration and/or interaction is facilitated by predominantly lower molecular weight molecules. Low molecular weight hydrogenated polyolefin polyols or olefin-based block copolymers having narrower polydispersities (i.e., closer to the ideal of 1), in which high molecular weight fractions are less than for materials having similar number average molecular weights but broader (higher) polydispersities, are believed to offer an advantage in either better adhesion at lower levels of incorporation or effective adhesion achieved under milder conditions (lower temperatures and/or shorter interaction times). "Polydispersity," also known simply as "dispersity," is defined in polymer science as the ratio of the weight average molecular weight to the number average molecular weight. Higher polydispersity numbers indicate a broader distribution of molecular weights, and in particular mean a larger fraction of higher molecular weight species.

The olefin-based block copolymer or low molecular weight hydrogenated polyolefin polyol used to prepare the free paint films of the invention thus preferably has a narrow polydispersity. When the low molecular weight olefin polymer is anionically polymerized it may have a very narrow polydispersity, such as on the order of only about 1.1. The ring-opening reactions of lactones and alkylene oxides or reactions of other materials that add head-to-tail like the hydroxy carboxylic acids tend to produce polymers that have narrow polydispersities. Modification of the olefin polymer by a head-to-tail reaction such as a ring-opening reaction of a lactone or alkylene oxide compound usually results in a product having a polydispersity of about 1.1 or 1.15, thus essentially preserving the narrow polydispersity of the hydroxyl-functional olefin starting material. The block copolymers used in the films of the invention preferably have polydispersities of about 1.2 or less, and more preferably have polydispersities of about 1.15 or less.

Again while not wishing to be bound by theory, it is believed that the modification of the low molecular weight olefin polymer by the (poly)ester or (poly)ether block or blocks offers significant advantages in providing adhesion of the free paint film to olefinic substrates because of increased compatibility of the resulting block copolymer toward materials commonly employed in the coating layers of the paint film. Thus, free paint films that will have good adhesion when applied to a TPO substrate may include much less of the block copolymer as compared to the low molecular weight, saturated or substantially saturated polyolefin polyol. In addition, the imposition of the (poly)ester or (poly)ether block between the olefin block and the functional group, such as the hydroxyl group, makes that functional group more accessible for reaction during the curing during formation of the free paint films. These principles can be used to optimize the olefin-based block copolymer of the invention for use under particular conditions or with or in particular coating compositions.

In a preferred embodiment, the olefin polymer is reacted with a lactone or a hydroxy carboxylic acid to form an olefin-based polymer having (poly)ester end blocks. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Lactones useful in the practice of the invention can also be characterized by the formula:

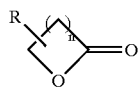

wherein n is a positive integer of 1 to 7 and R is one or more H atoms, or substituted or unsubstituted alkyl groups of 1–7 carbon atoms.

The lactone ring-opening reaction is typically conducted under elevated temperature (e.g., 80–150° C.). When the reactants are liquids a solvent is not necessary. However, a solvent may be useful in promoting good conditions for the reaction even when the reactants are liquid. Any non-reactive solvent may be used, including both polar and nonpolar organic solvents. Examples of useful solvents include, without limitation, toluene, xylene, methyl ethyl ketone, methyl isobutyl ketone, and the like and combinations of such solvents. A catalyst is preferably present. Useful catalysts include, without limitation, proton acids (e.g., octanoic acid, Amberlyst® 15 (Rohm & Haas)), and tin catalysts (e.g., stannous octoate). Alternatively, the reaction can be initiated by forming a sodium salt of the hydroxyl group on the molecules that will react with the lactone ring.

A hydroxy carboxylic acid can also be used instead of a lactone or in combination with a lactone as the compound that reacts with the low molecular weight olefin polymer to provide ester blocks. Useful hydroxy carboxylic acids include, without limitation, dimethylhydroxypropionic acid, hydroxy stearic acid, tartaric acid, lactic acid, 2-hydroxyethyl benzoic acid, N-(2-hydroxyethyl)ethylene diamine triacetic acid, and combinations of these. The reaction can be conducted under typical esterification conditions, for example at temperatures from room temperature up to about 150° C., and with catalysts such as, for example, calcium octoate, metal hydroxides like potassium hydroxide, Group I or Group II metals such as sodium or lithium, metal carbonates such as potassium carbonate or magnesium carbonate (which may be enhanced by use in combination with crown ethers), organometallic oxides and esters such as dibutyl tin oxide, stannous octoate, and calcium octoate, metal alkoxides such as sodium methoxide and aluminum tripropoxide, protic acids like sulfuric acid, or Ph$_4$SbI. The reaction may also be conducted at room temperature with a polymer-supported catalyst such as Amerlyst-15® (available from Rohm & Haas) as described by R. Anand in Synthetic Communications, 24(19), 2743–47 (1994), the disclosure of which is incorporated herein by reference.

While polyester segments may likewise be produced with dihydroxy and dicarboxylic acid compounds, it is preferred to avoid such compounds because of the tendency of reactions involving these compounds to increase the polydispersity of the resulting block copolymer. If used, these compounds should be used in limited amounts and preferably employed only after the lactone or hydroxy carboxylic acid reactants have fully reacted.

The reaction with the lactone or hydroxy carboxylic acid or oxirane compounds adds at least one monomer unit as the B block and preferably provides chain extension of the olefin polymer. In particular, the (poly)ester and/or (poly)

ether block is thought to affect the polarity and effective reactivity of the end group functionality during curing of the coating layer of the free paint film. The (poly)ester and/or (poly)ether block also makes the olefin-based block copolymer more compatible with components of a typical curable coating composition. The amount of the extension depends upon the moles of the alkylene oxide, lactone, and/or hydroxy carboxylic acid available for reaction. The relative amounts of the olefin polymer and the alkylene oxide, lactone, and/or hydroxy acid can be varied to control the degree of chain extension. The reaction of the lactone ring, oxirane ring, and/or hydroxy carboxylic acid with a hydroxyl group results in the formation of an ether or ester and a new resulting hydroxyl group that can then react with another available monomer, thus providing the desired chain extension. In the preferred embodiments of the present invention, the equivalents of oxirane, lactone, and/or hydroxy carboxylic acid for each equivalent of hydroxyl on the olefin polymer are from about 0.5 to about 25, more preferably from about 1 to about 10, and even more preferably from about 2 to about 6. In an especially preferred embodiment about 2.5 equivalents of lactone are reacted for each equivalent of hydroxyl on the olefin polymer.

In another embodiment of the invention, a polyolefin having terminal hydroxyl groups is reacted with an oxirane-containing compound to produce (poly)ether endblocks. The oxirane-containing compound is preferably an alkylene oxide or cyclic ether, especially preferably a compound selected from ethylene oxide, propylene oxide, butylene oxide, tetrahydrofuran, and combinations of these. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The hydroxyl group of the olefin-based polymer functions as initiator for the base-catalyzed alkylene oxide polymerization. The polymerization may be carried out, for example, by charging the hydroxyl-terminated olefin polymer and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition.

Tetrahydrofuran polymerizes under known conditions to form repeating units

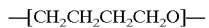

Tetrahydrofuran is polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of the olefin polymer.

It is also highly desirable for the olefin-based block copolymer of the invention to have functional groups that are reactive with one or more film-forming components of the free paint film layer to which it is added or with a layer of the free paint film adjacent to the layer containing the olefin-based block copolymer. The film-forming components with which the olefin-based block copolymer may be reactive may be, for example, a film-forming polymer or a curing agent. The reactive functional groups on the olefin-based block copolymer may include, without limitation, hydroxyl, carbamate, urea, carboxylic acid, and combinations of these. Following addition of the ether or ester blocks, the block copolymer of the invention has one or more hydroxyl groups, which may be reactive with the film-forming polymer or curing agent. If desired, the hydroxyl groups may be converted to other functional groups, including carbamate, urea, carboxylic acid groups and combinations of these. Carbamate groups according to the invention can be represented by the structure

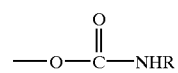

in which R is H or alkyl, preferably of 1 to 4 carbon atoms. Preferably R is H or methyl, and more preferably R is H. Urea groups according to the invention can be represented by the structure

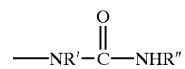

in which R' and R" are each independently H or alkyl, or R' and R" together form a heterocyclic ring structure. Preferably, R' and R" are each independently H or alkyl of from 1 to about 4 carbon atoms or together form an ethylene bridge, and more preferably R' and R" are each independently H. Hydroxyl groups can be converted to carbamate groups by reaction with a monoisocyanate (e.g., methyl isocyanate) to form a secondary carbamate group (that is, a carbamate of the structure above in which R is alkyl) or with cyanic acid (which may be formed in situ by thermal decomposition of urea) to form a primary carbamate group (i.e., R in the above formula is H). This reaction preferably occurs in the presence of a catalyst as is known in the art. A hydroxyl group can also be reacted with phosgene and then ammonia to form a primary carbamate group, or by reaction of the hydroxyl with phosgene and then a primary amine to form a compound having secondary carbamate groups. Finally, carbamates can be prepared by a transesterification approach where hydroxyl group is reacted with an alkyl carbamate (e.g., methyl carbamate, ethyl carbamate, butyl carbamate) to form a primary carbamate group-containing compound. This reaction is performed at elevated temperatures, preferably in the presence of a catalyst such as an organometallic catalyst (e.g., dibutyltin dilaurate). A hydroxyl group can be conveniently converted to a carboxylic acid by reaction with the anhydride of a dicarboxylic acid. It is possible and may be desirable to derivatize the hydroxyl functional olefin-based block copolymer to have other functional groups other than those mentioned, depending upon the particular free paint film layer composition in which the olefin-based block copolymer is to interact. The hydroxyl groups of the low molecular weight polyolefin polyol may also be derivatized to hydroxyl, carbamate, urea, carboxylic acid, or other functional groups. For convenience, the term "polyolefin polyol" as used in the description of this invention is used to encompass such derivatives having different functional groups. The functional groups, whether hydroxyl or the other functional groups, react during curing to crosslink to a cured film.

The free paint film is formed by applying an adhesion promoter composition or a coating composition that contains the low molecular weight hydrogenated polyolefin polyol or the olefin-based block copolymer to a substrate from which the formed film may later be removed. The substrate must be one that the composition containing the hydrogenated polyolefin polyol or olefin-based block copolymer will wet and upon which the composition will form a continuous film. The applied layer is thermoset or cured. One or more further paint film layers may be applied on top of the first layer formed from curing the composition containing the hydrogenated polyolefin polyol or polyolefin polyol olefin-based block copolymer. The formed paint film, having at least the layer containing the cured hydrogenated polyolefin polyol or olefin-based block copolymer composition and optionally having additional layers, is removed from the substrate upon which it was formed, for example with water and heat or with steam.

Examples of substrates upon which the free paint film may be formed include polypropylene, high density polyethylene, copolymers of ethylene with other polymerizable olefins, copolymers of propylene with other polymerizable olefins, and thermoplastic polyolefin substrates. The substrate preferably is not softened by the heat used in removing the paint film.

The free paint film may have a film thickness of from about 0.1 mil to about 20 mils, preferably from about 1 mil to about 10 mils, and more preferably from about 1 mil to about 5 mils.

The olefin-based block copolymer or hydrogenated polyolefin polyol may be used to prepare one or more layers of the free paint film. In one preferred embodiment, the olefin-based block copolymer forms an innermost layer of an adhesion promoter. Alternatively, the olefin-based copolymers of the invention can be used as an additive in preparing crosslinked (thermoset) coating layer(s) of the free paint film to provide excellent adhesion to olefinic substrates like TPO.

First, the olefin-based block copolymer or hydrogenated low molecular weight polyolefin polyol can be used in an adhesion promoter. The olefin-based block copolymer or hydrogenated polyolefin polyol can be used alone as an adhesion promoter layer, particularly if the viscosity is sufficiently low to flow out to form a substantially continuous layer on the substrate. In most cases, however, it will be desirable to combine the olefin-based block copolymer or hydrogenated polyolefin polyol with other components, including for example and without limitation crosslinking agents reactive with the functionality on the olefin-based block copolymer or polyolefin polyol, solvents including water and organic solvents, pigments, customary coatings additives, and combinations of these.

In one preferred embodiment, the adhesion promoter is a solution or dispersion that includes only the olefin-based block copolymer or hydrogenated polyolefin polyol as the vehicle. In this embodiment, it is preferred to first apply the adhesion promoter directly to the plastic substrate and then to apply a layer of a coating composition that includes one or more components reactive with the olefin-based block copolymer or hydrogenated polyolefin polyol of the adhesion promoter layer. Applying coating layers "wet-on-wet" is well known in the art.

In an alternative embodiment, the adhesion promoter includes, in addition to the olefin-based block copolymer or hydrogenated polyolefin polyol, at least one crosslinking agent reactive with the olefinic polymer. The curing agent has, on average, at least about two crosslinking functional groups. Suitable curing agents for active-hydrogen functional olefin-based copolymers or hydrogenated polyolefins include, without limitation, materials having active methylol or methylalkoxy groups, such as aminoplast crosslinking agents or phenol/formaldehyde adducts, curing agents that have isocyanate groups, particularly blocked isocyanate curing agents; and combinations of these. Examples of preferred curing agent compounds include melamine formaldehyde resins (including monomeric or polymeric melamine resin and partially or fully alkylated melamine resin), blocked or unblocked polyisocyanates (e.g., toluene diisocyanate, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), polysiloxanes (e.g., trimethoxy siloxane), and combinations of these. Unblocked polyisocyanate curing agents are usually formulated in two-package (2K) compositions, in which the curing agent and the film-forming polymer (in this cased the block copolymer or polyolefin) are mixed only shortly before application and because the mixture has a relatively short pot life. The curing agent may be combinations of these, particularly combinations that include aminoplast crosslinking agents. Aminoplast resins such as melamine formaldehyde resins or urea formaldehyde resins are especially preferred. For this embodiment of the adhesion promoter, the applied adhesion promoter may be either coated "wet-on-wet" with a one or more additional coating compositions, and then all layers cured together, or the adhesion promoter layer may be partially or fully cured before being coated with any additional coating layers. Curing the adhesion promoter layer before applying an additional coating layer may allow the subsequent coating layer to be applied electrostatically when the adhesion promoter is formulated with a conductive pigment, such as carbon black according to methods known in the art.

Secondly, the olefin-based block copolymer or hydrogenated low molecular weight polyolefin polyol can be added to a variety of coating compositions to produce free paint films that have excellent adhesion to plastic substrates, particularly to olefinic substrates including TPO. Compositions in which the olefin-based block copolymer or hydrogenated low molecular weight polyolefin polyol may be used include primers, one-layer topcoats, basecoats, and clearcoats. The free paint film having at its inner surface the coating layer with the olefin-based block copolymer or hydrogenated low molecular weight polyolefin polyol can be applied directly to an uncoated and unmodified olefin-based substrate or other plastic, especially a TPO substrate, to form a paint layer thereon having excellent adhesion to the substrate. In the case of adding the polyolefin material to a basecoat or one-layer topcoat composition, the adhesion promoter or primer layers of the free paint film are then not necessary, and the free paint film can be formed from the topcoat coating layers alone. When the olefin-based block copolymer or hydrogenated low molecular weight polyolefin polyol is added to a clearcoat composition, the free paint film of the clearcoat can be applied directly to a colored polyolefin substrate, particularly a colored TPO substrate, also known as color-in-mold. This method produces a colored part having better appearance, exterior durability, scratch resistance, and mar resistance as compared to the relatively soft uncoated TPO substrate.

The composition used to form the innermost layer of the free paint film preferably includes at least about 0.001% by weight of the olefin-based block copolymer, based upon the total weight of nonvolatile vehicle. In one preferred embodiment, the olefin-based block copolymer of the invention is included in the coating composition in an amount of from about 0.001% to about 4% by weight of the total weight of nonvolatile vehicle. In another preferred embodiment, the olefin-based block copolymer of the invention is included in the coating composition in an amount of from about 0.1% to about 10% by weight of the total weight of nonvolatile vehicle, more preferably from about 0.2% to about 5% by weight of the nonvolatile vehicle, and still more preferably from about 0.2% to about 3% of the nonvolatile vehicle of the coating composition. Vehicle is understood to be the resinous and polymer components of the coating composition, which includes film forming resins and polymers, crosslinkers, other reactive components such as the block copolymer of the invention, and other reactive or nonreactive resinous or polymeric components such as acrylic microgels.

When the innermost layer of the free paint film includes the hydrogenated low molecular weight polyolefin polyol, the hydrogenated low molecular weight polyolefin polyol is preferably included in amounts o from about 5% to about 45% of the nonvolatile vehicle, more preferably from about 5% to about 30% of the nonvolatile vehicle.

The coating compositions used in forming the free paint film may contain a wide variety of film-forming resins. At least one crosslinkable resin is included. The resin may be self-crosslinking, but typically a coating composition includes one or more crosslinking agents reactive with the functional groups on the film-forming resin. Film-forming resins for coating compositions typically have such functional groups as, for example, without limitation, hydroxyl, carboxyl, carbamate, urea, epoxide (oxirane), primary or secondary amine, amido, thiol, silane, and so on and combinations of these. The film-forming resin may be any of those used in coating compositions including, without limitation, acrylic polymers, vinyl polymers, polyurethanes, polyesters, polyethers, epoxies, and combinations and graft copolymers of these. Also included are polymers in which one kind of polymer is used as a monomer in forming another, such as a polyester-polyurethane or a polyether-polyurethane in which a dihydroxy functional polyester or polyether is used as a monomer in the urethane polymerization reaction. One preferred film-forming resin is a hydroxy-functional acrylic resin. Many references describe film-forming polymers for curable coating compositions and so these materials do not need to be described in further detail here.

When the coating composition includes a curing agent, or crosslinker, the crosslinker is preferably reactive with both the olefin-based block copolymer and the polymeric film-forming resin. The curing agent has, on average, at least about two crosslinking functional groups, and is preferably one of the crosslinking materials already described above. Aminoplast resins such as melamine formaldehyde resins or urea formaldehyde resins are especially preferred for resin functional groups that are hydroxyl, carbamate, and/or urea. The coating compositions of the invention can be formulated as either one-component (one-package or 1K) or two-component (two-package or 2K) compositions, as is known in the art.

The adhesion promoter or coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzene-sulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

A solvent may optionally be included in the adhesion promoter or coating composition used in the practice of the present invention, and preferably at least one solvent is included. In general, the solvent can be any organic solvent and/or water. It is possible to use one or more of a broad variety of organic solvents. The organic solvent or solvents are selected according to the usual methods and with the usual considerations. In a preferred embodiment of the invention, the solvent is present in the coating composition in an amount of from about 0.01 weight percent to about 99 weight percent, preferably for organic solventborne compositions from about 5 weight percent to about 70 weight percent, and more preferably for topcoat compositions from about 10 weight percent to about 50 weight percent.

In another preferred embodiment, the solvent is water or a mixture of water with any of the typical co-solvents employed in aqueous dispersions. When the olefin-based block copolymer is to be used in a waterborne composition, it is advantageous to include in the block copolymer at least one polyethylene oxide segment to aid in dispersing the material. When modified with a polyethylene oxide segment, the block copolymer of the invention may be dispersed in water, optionally with other components (crosslinkers, additives, etc.) and then applied as an adhesion promoter or added to an aqueous coating composition as an aqueous dispersion of the block copolymer. Alternatively, the olefin-based block copolymer or hydrogenated low molecular weight polyolefin polyol may be blended with the film-forming polymer and then dispersed in water along with the film-forming polymer. In the latter method, it is contemplated that the block copolymer need not be modified with a hydrophilic segment, and instead the affinity of the block copolymer for the film-forming vehicle can be relied upon to maintain the components in a stable dispersion.

Additional agents known in the art, for example and without limitation, surfactants, fillers, pigments, stabilizers, wetting agents, rheology control agents (also known as flow control agents), dispersing agents, adhesion promoters, UV absorbers, hindered amine light stabilizers, silicone additives and other surface active agents, etc., and combinations of these may be incorporated into the adhesion promoter or coating composition containing the olefin-based block copolymer.

The adhesion promoter and coating compositions can be coated on the forming substrate by any of a number of techniques well-known in the art. These include, without limitation, spray coating, dip coating, roll coating, curtain coating, and the like. Spray coating is one preferred method of applying the compositions used to form the free paint film.

The olefin-based block copolymer can be added to a topcoat coating composition in amounts that do not substantially change the gloss of the topcoat. In one application, for example, the olefin-based block copolymer is utilized in a topcoat composition, in particular a clearcoat composition which produces a high-gloss cured coating, preferably having a 20° gloss (ASTM D523-89) or a DOI (ASTM E430-91) of at least 80 that would be suitable for exterior automotive components. In another application, the olefin-based block copolymer may be added a topcoat composition that produces a low gloss coating, such as for coating certain automotive trim pieces. Typical low gloss coatings have a gloss of less than about 30 at a 60° angle.

When the coating composition of the invention is used as a high-gloss pigmented paint coating, the pigment may include any organic or inorganic compounds or colored materials, fillers, metallic or other inorganic flake materials such as mica or aluminum flake, and other materials of kind that the art normally names as pigments. Pigments are usually used in the composition in an amount of 0.2% to 200%, based on the total solid weight of binder components (i.e., a pigment-to-binder ratio of 0.002 to 2). As previously mentioned, adhesion promoters preferably include at least one conductive pidment, such as carbon black in an amount at makes the coating produced suitable for electrostatic applications of further coating layers.

The adhesion promoters and coating compositions can be applied at thicknesses that will produce dry film or cured film layer thicknesses typical of the art, such as from about 0.1 to about 5.0 mils for each layer. Typical thicknesses for adhesion promoter layers are from about 0.1 to about 0.5 mils, preferably from about 0.2 to about 0.3 mils. Typical thicknesses for primer layers are from about 0.5 to about 2.0 mils, preferably from about 0.7 to about 1.5 mils. Typical thicknesses for basecoat layers are from about 0.2 to about 2.0 mils, preferably from about 0.5 to about 1.5 mils. Typical thicknesses for clearcoat layers or one-layer topcoats are from about 0.5 to about 3.0 mils, preferably from about 1.5 to about 2.5 mils.

The adhesion promoters and coating compositions described herein are preferably thermally cured. Curing temperatures will vary depending on the particular blocking groups used in the cross-linking agents, however they generally range between 225° F. and 270° F. In a preferred embodiment, the cure temperature is preferably between 230° F. and 270° F., and more preferably at temperatures no higher than about 250° F. The curing time will vary depending on the particular components used, and physical parameters such as the thickness of the layers, however, typical curing times range from 15 to 60 minutes, and preferably 20–35 minutes. The most preferred curing conditions depends upon the specific coating composition and substrate, and can be discovered by straightforward testing.

After curing, the paint film is removed from the forming substrate to produce the free paint film of the invention. Preferably, the paint film is peeled from the substrate at ambient temperatures or at slightly elevated temperatures, for example from about 120° F. to about 150° F. The film may be removed after soaking in water for a period of time, such as from about 1 hour to about 24 hours, or with steam. The substrate upon which the paint film is formed should have a high enough softening temperature, melting-point, or glass transition temperature, so that it does not soften at the curing temperature of the film. An olefinic substrate is thought to help the olefin-based block copolymer or hydrogenated low molecular weight polyolefin polyol concentrate at the coating-substrate interface, and for that reason olefinic substrates are preferred as the substrate upon which the paint film is formed. The substrate upon which the paint film is formed may be, for example, polytetrafluoroethylene, polyethylene (particularly high density polyethylene) which has a high crystallinity, polypropylene, or thermoplastic polyolefin (TPO, a rubber-filled, e.g. EPDM rubber-filled, polyolefin substrate) substrates, preferably such substrates having high crystallinity (crystallinity of 50% or more, preferably 75% or more). Other substrates, including non-olefinic substrates, may also be useful, particularly a substrate having crystallinity, greater than or equal to crystallinity of high density polyethylene, or polypropylene.

The free paint film with the layer of adhesion promoter or thermoset coating is applied directly to an unmodified and untreated plastic substrate. The free paint film is place into intimate contact with the plastic substrate. The film and substrate is heated to a sufficient temperature and for a sufficient time to cause the film to adhere to the substrate. The film and substrate may be heated, for example to a temperature of at least about 200° F., more preferably from about 225° F. to about 300° F., for a period of from about 5 minutes to about 60 minutes, preferably from about 15 minutes to about 40 minutes. It may be beneficial to heat the substrate to a temperature at which the plastic softens or begins to soften. Pressure could also be applied in aid in forming the adhesion, for example by passing a roller over the surface of the film. Of course, the pressure should not be so great as to deform either the film or the substrate.

In a preferred embodiment, the film is applied to a contoured surface and conforms to the surface during the time the film and substrate are heated to cause the adhesion between film and substrate.

The free films of the invention are much cheaper to apply than coating compositions because the expense of a paint shop (including paint application equipment and abatement equipment for emissions) is avoided. It is also advantageous in the coating of automotive parts that the same paint can be applied to the small part as a free paint film as is applied to the automotive body. Thus, the paint on the part will have the same appearance and the same durability as the paint on the body.

The free paint films of the invention are particularly suited to coating olefinic substrates, including, without limitation, TPO substrates, polyethylene substrates, and polypropylene substrates. Other plastic substrates may be used, and preferred other substrates will have a softening point or Tg that is low enough so that the film and substrate may be heated to that temperature without detriment to the film. Thus, the free paint films may also be used to coat other thermoplastic and thermoset substrates, including, without limitation, polycarbonate, polyurethane, and flexible substrates like EPDM rubber or thermoplastic elastomers. Such substrates can be formed by any of the processes known in the art, for example, without limitation, injection molding and reaction injection molding, compression molding, extrusion, and thermoforming techniques.

The free film of the invention may be used to coat an entire surface of an article. The free film of the invention may also be formed into a piece suitable for coating a smaller area than the entire surface, for example for spot repairing a coating. In the case of spot repairing an existing coating, the free paint film preferably has tapering edge thicknesses to help to blend the spot repair into the remaining coating.

The materials and processes of the invention can be used to form a wide variety of coated articles, including, without limitation, appliance parts, exterior automotive parts and trim pieces, and interior automotive parts and trim pieces.

The invention is further described in the following examples. The examples are merely illustrative and do not in any way limit the scope of the invention as described and claimed. All parts are parts by weight unless otherwise noted.

Olefin-Based Block Copolymer 1.

To a flask, equipped with stirrer, condenser and nitrogen blanket, were added

| | |
|---|---|
| Kraton Liquid Polymer L2203 (obtained from Shell Chemical Co., Houston, TX) | 1400.0 grams |
| ε-caprolactone | 221.9 grams |
| xylene | 541.5 grams |
| stannous octoate | 2.5 grams |

The mixture was heated to and maintained at 145 degrees C for 2.75 hours. The product had a solids content (1 hr. at 110° C.) of 74.9%.

EXAMPLE 1

A commercial white basecoat composition (E98WM411B, available from BASF Corporation, Southfield, Mich.) was modified by addition of 1.5 grams of the Olefin-Based Block Copolymer 1 to 100 grams of the commercial white basecoat. The modified basecoat was then applied to panels of TPO (D161B, available from Solvay). A commercial clearcoat composition was applied wet-on-wet over the modified basecoat and the coating layers were cured by baking for 30 minutes at 250° F. The resulting coating had a basecoat thickness of about 1.2 mils and a clearcoat thickness of about 1.8 mils.

A free paint film was obtained by exposing the coated TPO surface to condensing humidity and peeling the paint film from the TPO surface.

The free film was then place on a fresh, uncoated TPO panel (D161B) and pressed flat. The panel was then baked for 30 minutes at 250° F. The resulting coating was glossy and had an excellent, smooth appearance. The coating was tested for adhesion according to the GM9071P tape adhesion method and had excellent adhesion.

The invention has been described in detail with reference to preferred embodiments thereof. It should be understood, however, that variations and modifications can be made within the spirit and scope of the invention and of the following claims.

What is claimed:

1. A free paint film, comprising at least an outer layer formed form a composition comprising an olefinic material selected from the group consisting of:

olefin-based block copolymers comprising an that is at least substantially saturated and at least one modifying block selected from (poly)ester blocks and (poly)ether blocks, wherein said olefin block is derived from a hydroxy-functional ethylene/butylene polymer.

2. A free paint film according to claim 1 further comprising at least one crosslinkable resin.

3. A free paint film according to claim 1, wherein the block copolymer has at least one functional group selected from hydroxyl groups, carbamate groups, urea groups, and carboxylic acid groups.

4. A free paint film according to claim 1, wherein the olefin block is derived from an at least substantially saturated polyhydroxylated polydiene polymer.

5. A free paint film according to claim 1, wherein the block copolymer comprises (poly) epsilon caparalactone box.

6. A free paint film according to claim 1, wherein the block copolymer has on average from about 0.7 to about 10 modifying blocks.

7. A free paint film according to claim 1, wherein the block copolymer has on average about 1.8 to about 2 modifying blocks.

8. A free paint film according to claim 1, wherein each modifing block has on average from about 0.5 to about 25 monomer units.

9. A free paint film according to claim 1, wherein the film further comprises one or more other layers.

* * * * *